Patented July 2, 1946

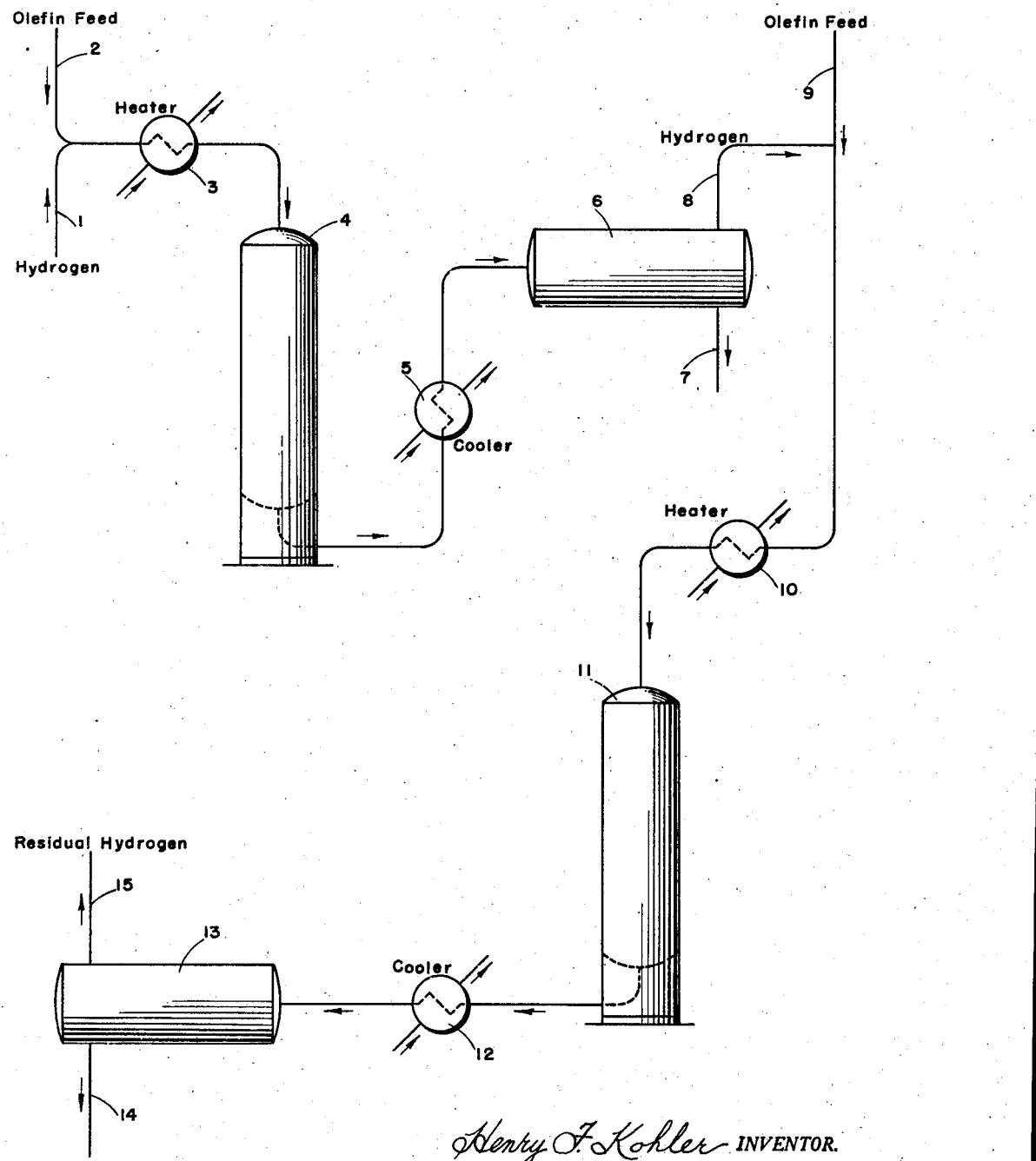

2,403,288

UNITED STATES PATENT OFFICE 2,403,288

PROCESS FOR HYDROGENATING OLEFINS

Henry F. Kohler, Baytown, Tex., assignor to Standard Oil Development Company, a corporation of Delaware Application September 25, 1943, Serial No. 503,773

3 Claims. (Cl. 260—683.6)

The present invention is directed to hydrogenation, and particularly to the hydrogenation of olefins.

In hydrogenation reactions it is desirable to maintain a high partial pressure of hydrogen in the reaction zone. For this reason practically all disclosures of hydrogenation reactions specify the use of large excesses of hydrogen. The present invention is concerned with providing a procedure whereby higher partial pressures of hydrogen can be maintained in the reaction zone, while hydrogenating a given amount of material to be hydrogenated with a given amount of hydrogen, than has hitherto been possible.

Particularly in the catalytic hydrogenation of olefins such as di-isobutylene, selective butylene polymer, or isobutylene-normal butylene copolymer to produce saturated hydrocarbons for aviation gasoline, it is necessary to use a large excess of hydrogen. In the hydrogenation of selective polymer (dimer of normal butylene) under low or moderate pressure (100 to 1000 pounds per square inch) there is a strong tendency for the polymer to depolymerize to butylene which is hydrogenated to butane. This is a disadvantage, as it not only decreases the yield of product, but also reduces the concentration of hydrogen in the recycled gas unless it is purified. The use of once-through hydrogen flow has the advantage over recycle operation in that less equipment is required, especially if it is necessary to purify the hydrogen. Excess hydrogen is needed not only completely to hydrogenate the olefins, but to permit the employment of lower temperatures and hence decrease butane formation.

According to the present invention, hydrogenation, particularly of the type hereinbefore referred to, is conducted by using two or more reactors in series, introducing the total amount of hydrogen into the first reactor and flowing it in series through the rest of the reactors while splitting the feed of the unsaturated material between the several reactors and separating from the reaction mixture between the reactors the hydrogenated material. Using two reactors for example in the hydrogenation of olefins, all of the hydrogen and half of the olefin feed are charged to the first reactor. The hydrogenated product and remaining gas are cooled and separated and the residual gas from the separator is then charged with the other half of the olefin feed to the second reactor and the products therefrom discharged into a separator where residual gas is separated from the product. To illustrate the advantage of this arrangement over one in which a single reactor is employed, assume that the total hydrogen charged to the reactor is 2000 cubic feet per barrel of olefin and the hydrogen consumed is 1000 cubic feet per barrel, leaving 1000 cubic feet per barrel of hydrogen in the effluent from the reactor. The average amount of hydrogen in the reactor would thus be 1500 cubic feet per barrel of olefin. When using the arrangement of the present invention and charging half of the olefin feed to each of two reactors while using the gas once-through, the ratio of hydrogen to olefin in the first reactor would actually be 2000 cubic feet per half barrel of olefin at the inlet and 1500 cubic feet per half barrel at the outlet, or an average quantity of hydrogen in the reactor of 3500 cubic feet per barrel, while the feed to the second reactor would be 1500 cubic feet of hydrogen per half barrel of olefin and in the effluent from the second reactor there would be 1000 cubic feet of hydrogen per half barrel of olefin, or an average quantity of hydrogen in the second reactor of 2500 cubic feet of hydrogen per barrel of olefin. Thus, assuming the same ratio of hydrogen to olefin in the total feed and the same consumption of hydrogen, the system of the present invention provides in each reactor an effective quantity of hydrogen of 3500 and 2500 cubic feet per barrel of olefin, respectively, as against 1500 cubic feet of hydrogen per barrel of olefin when the reaction is conducted in a single reactor. It will be seen that these effective ratios can be increased by increasing the number of reactors, but there will naturally be an upper limit to the reactors which may be employed where the cost of equipment will exceed the value of the improvement effected.

The nature of the present invention may be more clearly understood by reference to the accompanying drawing, in which the single figure is a diagrammatic representation of a flow plan according to the present invention.

Referring to the drawing in detail, numeral 1 designates a hydrogen feed line, while numeral 2 designates an olefin feed line. All of the hydrogen to be employed is introduced through line 1, while, in the case illustrated, where two reactors are employed, half of the olefin feed is introduced by way of line 2, the two feeds being mixed and passed through a heater 3 into a reactor 4. The effluent from the reactor is passed through a cooler 5 into a separator 6, from the bottom of which, through line 7, paraffin hydrocarbons are withdrawn and from the top of which, through line 8, residual hydrogen is carried off to be mixed with the second half of the olefin feed introduced through line 9.

The second cycle is exactly the same as the first, the mixture of olefin and hydrogen passing through heater 10 into reactor 11 and thence into cooler 12 and separator 13, from which paraffin hydrocarbons are withdrawn through line 14 and residual hydrogen is discharged through line 15. By reason of the high partial pressures of hydrogen possible in this type of operation and the consequent reduced operating temperature, the content of hydrocarbons in the residual hydrogen may be sufficiently low to permit its being recycled to the hydrogen inlet. In case there is substantial contamination of the residual hydrogen with hydrocarbons, however, it can be more economically discarded when operating in accordance with the present invention than in case of a single reactor, because, as previously illustrated, by reason of the split olefin feed the hydrogen in the present method of working is as effective as a much larger quantity of hydrogen used in a single reactor.

It will be understood that in carrying out the process according to the flow plan illustrated, a suitable catalyst will be employed and suitable conditions of temperature and pressure will be maintained. These working conditions need not be enumerated here bacause the present invention is not concerned with particular hydrogenation conditions or particular catalysts, but only with a novel method of handling the reactants.

It is not necessary that the olefin feed stock be equally divided between the reactors in order to realize some of the advantages of the present invention. Practically any splitting up of the olefin feed while effecting separation between the successive reactors will result in the maintenance of higher hydrogen-olefin ratios in the individual reactors than in the case where a single reactor is employed. The most effective ratios are maintained in the separate reactors, however, by dividing the olefins substantially equally between the reactors. It may be mentioned that these effective hydrogen-olefin ratios cannot be realized efficiently by using a single reactor and injecting the olefin feed at several points along the reactor, because in the latter half of the reactor there will be a substantial concentration of paraffins as well as olefins, thereby reducing the partial pressure of the hydrogen to the point where it is necessary to use higher tempertaures to obtain effective hydrogenation with resultant depolymerization of the olefin where the olefin feed stock is a polymer.

The nature and objects of the present invention having been thus described and illustrated, what is claimed as new and useful and desired to be secured by Letters Patent is:

1. In the vapor phase hydrogenation of unsaturated bodies the steps of utilizing a plurality of reactors in series, introducing at least twice the amount of hydrogen consumed in the process into the first reactor and passing it through the reactors in succession, splitting the total feed of the unsaturated body between the several reactors and separating saturated product from the hydrogen between the successive reactors.

2. In the vapor phase hydrogenation of olefins the steps of utilizing a plurality of reactors in series, introducing at least twice the amount of hydrogen consumed in the process into the first reactor and passing it through the remaining reactors in succession, splitting the olefin feed between the several reactors and separating paraffins from the hydrogen between the successive reactors.

3. A method according to claim 2 in which the olefin is a polymer having a tendency to depolymerize under the conditions maintained in the hydrogenation reaction.

HENRY F. KOHLER.